United States Patent [19]

Rioux

[11] Patent Number: 5,177,556
[45] Date of Patent: Jan. 5, 1993

[54] THREE DIMENSIONAL COLOR IMAGING

[75] Inventor: Marc Rioux, Ottawa, Canada

[73] Assignee: National Research Council of Canada, Ottawa, Canada

[21] Appl. No.: 704,092

[22] Filed: May 22, 1991

[30] Foreign Application Priority Data

May 24, 1990 [CA] Canada .................. 2017518

[51] Int. Cl.⁵ .................. G01B 11/24; G01J 3/50
[52] U.S. Cl. .................. 356/73; 356/326; 356/376
[58] Field of Search .................. 356/73, 376, 402, 407, 356/425, 300, 326, 328

[56] References Cited

U.S. PATENT DOCUMENTS

| | | |
|---|---|---|
| 3,986,774 | 10/1976 | Lowrey et al. |
| 4,072,405 | 2/1978 | Ozeki |
| 4,171,917 | 10/1979 | Pirlet |
| 4,349,277 | 9/1982 | Mundy et al. |
| 4,627,734 | 12/1986 | Rioux |
| 4,645,347 | 2/1987 | Rioux |
| 4,701,049 | 10/1987 | Beckmann et al. |

OTHER PUBLICATIONS

P. J. Besl "Active, Optical Range Imaging Sensors" published in Machine Vision and Applications (1988) 1:127-152.

Primary Examiner—F. L. Evans

[57] ABSTRACT

Three dimensional digital imaging of the profile of a surface of an object is improved to include the collection of data on the color of the surface, this result being achieved with only minor changes to a monochromatic 3-D camera and without the complications of multiple detectors or multiple color filters. The surface is scanned with an incident beam of light that contains a plurality of wavelengths including at least one well defined wavelength, e.g. either three well defined wavelengths corresponding respectively to the primary colors, or a continuum of visible light plus one well defined wavelength outside such continuum. The return beam that is analyzed to generate the digital profile data is dispersed into a plurality of separate return beams according to wavelength, the relative intensities of such separate return beams providing the color data.

17 Claims, 2 Drawing Sheets

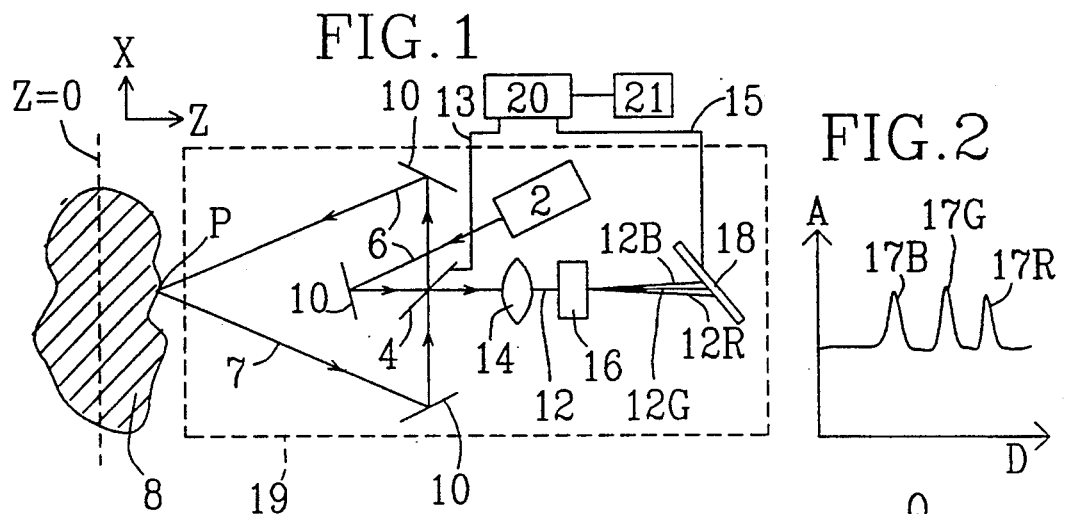
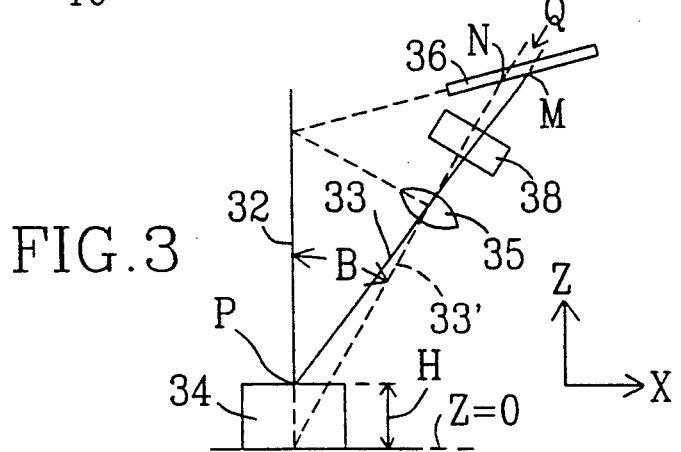
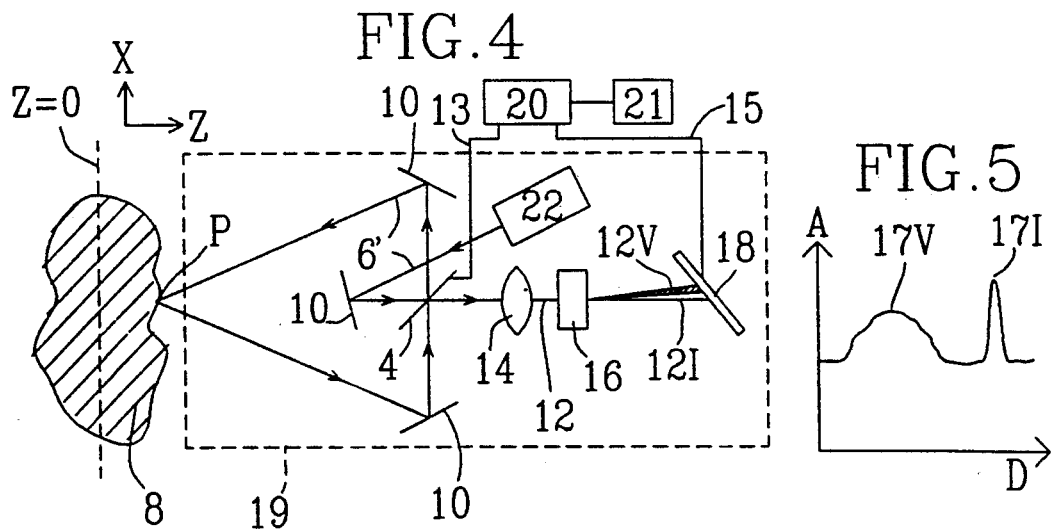

5,177,556

THREE DIMENSIONAL COLOR IMAGING

FIELD OF THE INVENTION

The invention relates to three dimensional (3-D) color imaging of the profile of a target surface.

BACKGROUND OF THE INVENTION

Monochromatic 3-D imaging of objects is known and has applicability to the accumulation of detailed data on the shapes and surface profiles of objects (articles, scenes and/or persons), to the automatic inspection or assembly of objects, to robotics generally, and to various medical applications.

PRIOR ART

It has been known for many years that optical triangulation can yield accurate knowledge of range and hence of the profile of a target surface. Typical prior U.S. patents that describe implementation of the triangulation principle are U.S. Pat. No. 3,986,774 (Lowrey et al); U.S. Pat. No. 4,171,917, Oct. 23, 1979 (Pirlet); U.S. Pat. No. 4,349,277, Sep. 14, 1982 (Mundy et al); U.S. Pat. No. 4,627,734, Dec. 9, 1986 (Rioux); and U.S. Pat. No. 4,701,049, Oct. 20, 1987 (Beckman et al).

The patents to Pirlet and Rioux teach triangulation configurations in which the surface is scanned by a beam of light. A synchronously scanning receiver images reflected light onto a position sensitive detector, e.g. a CCD (charge coupled device), to generate electrical signals indicative of range deviations of points on the surface from a reference plane.

Beckman et al also disclose a measuring system employing the triangulation principle. This patent is directed to techniques for improving resolution by varying the cross-section of the measuring beam, and includes a feature of viewing a lighted dot on the target surface at two different angles to discriminate a true reflection from a false one.

Mundy et al employ the optical parallax triangulation principle in which a color pattern is projected onto the surface, shifts of wavelength bands being detected on separate detector arrays, these shifts corresponding to the profile of the surface.

U.S. Pat. No. 4,645,347, Feb. 24, 1987 (Rioux) teaches another method of measuring profile. It uses a converging lens with a mask having two apertures. The spacing between images on a detector represents the range deviation of points on the target surface from a reference plane, e.g. the focal plane of the converging lens.

Alternatively, the range data can be detected by methods other than the triangulation method, such as by time of flight (radar) measurement. A full summary of the various methods of optical ranging is provided in "Active, Optical Range Imaging Sensors" by Paul J. Besl, published in Machine Vision and Applications (1988) 1:127-152.

However, none of these known systems also collects data on the color of the target surface.

On the other hand, there are many prior patents on color video cameras. U.S. Pat. No. 4,072,405, Feb. 7, 1978 (Ozeki), for example, uses a prism combination together with color filters in a video camera to separate the three primary color components. Three detectors, one for each primary color, produce the red, green and blue signals, which are processed into a color TV signal. Total color separation is required, thus calling for separate detectors.

SUMMARY OF THE INVENTION

The primary objective of the present invention is to provide a method by which the advantages of collecting color data along with the 3-D data can be achieved in a way that is so simple that it requires only relatively minor modifications to the known monochromatic 3-D cameras already in use.

More specifically, the objective is to avoid or minimize the complications of multiple detectors, or multiple color filters, or other major changes to the components required in a 3-D camera.

The invention meets this requirement by providing a method and apparatus in which the target surface is scanned by an incident beam of light that contains a plurality of wavelengths including at least one well defined wavelength. A return beam reflected from the surface is dispersed into a plurality of return beams which are received by a position sensitive detector to generate signals that represent the color of the surface.

In this system only a single position sensitive detector is needed. Moreover, this detector can function monochromatically, i.e. without any need for color filters or other color sensitive devices.

As a result, the invention enables existing, monochromatic, 3-D cameras to be readily modified to furnish color data. It is only necessary to change the nature of the source of light, to provide a color dispersing device in the return beam, and to modify the processing of the output signals from the detector in the camera. In all other respects, the camera can remain unchanged.

In one form of the invention the incident beam comprises three well-defined wavelengths, namely those of the primary colors, blue, green and red. This form of the invention is convenient for recording digital color data along with the digital profile data and for generating from this data displays suitable for viewing with the human eye.

In another form of the invention the incident beam mixes one well defined wavelength with a continuum of visible light, the well defined wavelength preferably being outside the visible spectrum, e.g. infrared, in order to be clearly distinguishable therefrom. This form of the invention is well adapted to applications in which very precise color measurements (colorimetry) are required, since the signals received in the detector from the visible continuum portion of the beam can be broken down into a relatively large number of wavelengths for detailed analysis.

BRIEF DESCRIPTION OF THE DRAWINGS

FIG. 1 is a schematic illustration of a first embodiment;

FIG. 2 shows signals generated in the embodiment of FIG. 1;

FIG. 3 shows a second embodiment;

FIG. 4 is a modification of FIG. 1;

FIG. 5 shows the signals generated by the arrangement of FIG. 4;

DETAILED DESCRIPTION OF THE PREFERRED EMBODIMENTS

Figure 6:
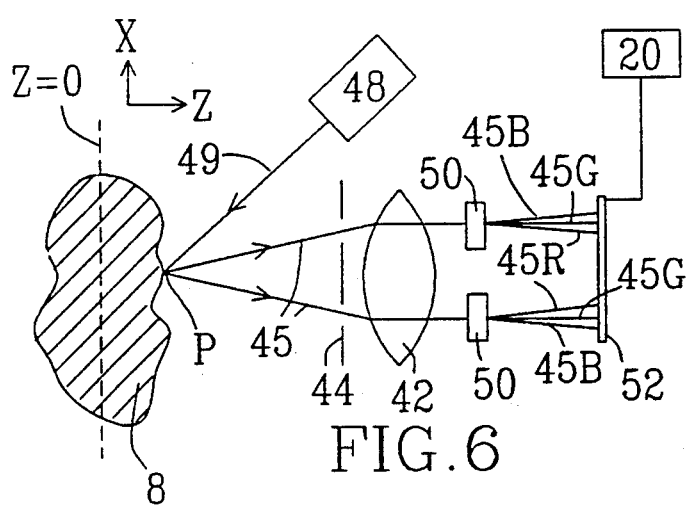
FIG. 6 shows a further embodiment.

FIG. 1 shows schematically a synchronous optical triangulation scanning system that functions in accordance with the teachings of Rioux U.S. Pat. No. 4,627,734 and is essentially alike in structure to the embodiment illustrated in FIG. 12 of such patent.

A light source 2. e.g. a RGB laser, produces a beam 6 that contains well defined red, green and blue wavelengths. Together with fixed mirrors 10, one surface of an oscillating double-sided mirror 4 scans the beam 6 in the X direction and projects it towards an object 8. Light 7 received back from a point P on the target surface of the object 8 is returned by a further fixed mirror 10, the opposite surface of the mirror 4, and a lens 14, in the form of a return beam 12 that is imaged onto a position sensitive detector 18, e.g. a CCD. Interposed in this beam 12 is a device 16 for dispersing the beam into separate return beams 12B, 12G and 12R of the three primary colors. While the dispersal device 16 can be a simple wedge, it is preferable to use either a double wedge or other device that will achieve a collinear effect, at least for one of the beams, preferably the green beam. In other words, the beam 12G will be a straight through continuation of the beam 12. This collinearity is, however, not essential.

The detector 18 measures the amplitudes A and the positions D of the respective beams 12B, 12G and 12R to generate the signals 17B, 17G and 17R shown in FIG. 2. The position of any one of these signals indicates the range of the point P, i.e. the deviation of the point P in the Z direction from a reference plane Z=0, such plane being perpendicular to the optical axis of the beam 12. The detector 18 is slanted to this optical axis because the focal plane varies with range. Since the positions of the 17R, 17G and 17B signals relative to each other do not vary substantially, any one, two, or all of these signals can be used to measure the Z deviation. Usually the signal with the greatest amplitude will be chosen for this purpose. If the color of the object is such that one of these signals is absent or is too small to measure, the colors of the two remaining signals can be identified by their spacing from each other.

If the detector 18 is two-dimensional, i.e. has pixels extending in the Y direction (perpendicular to both the X and Z directions) as well as in the X direction, the necessary scanning of the beams in the Y direction can conveniently be achieved by means of a further mirror oscillating about an axis extending in the X direction (see the mirror M6 in the FIG. 12 of U.S. Pat. No. 4,627,734 referred to above).

While oscillating mirrors are the preferred method of scanning, it is possible to achieve the same result by relative translation of the object 8 and the entire 3-D camera 19 that the other components so far described in FIG. 1 represent.

As in the prior art, a microprocessor 20 controls by a connection 13 the scanning of the mirror 4 (or the mirrors, if there are more than one). or the relative translation of the object 8 and the camera 19, while receiving and digitizing signals 17B, 17G, 17R on line 15 to produce 3-D color data that can be stored, used to identify the object or used to create a facsimile of it, which data can also be shown on a display 21.

A more basic triangulation configuration is shown in FIG. 3 wherein a beam 32 from an RGB laser, which beam is scanned in the Y direction by a mechanism (not shown), is projected onto a surface point P of an object 34. After passing through an imaging lens 35 and a dispersing device 38 for splitting the return beam 33 into the three primary colors (not separately shown in FIG. 3), such beam is received at M on a linear position sensitive detector 36. As before, the shift Q of the point M from a reference point N for a beam 33' that would be received from the reference plane Z=0 in the absence of the object 34, represents the height H of the point P from this plane. As before the color of the surface can be measured from the relative intensities of the three color beams. B is the triangulation angle and the slant of the detector 36 is a straight line projection from a point on the incident beam 32 that is intersected by an extension of the central transverse plane of the lens 35, as shown by the dotted lines.

FIG. 4 shows an embodiment similar to FIG. 1 except that the light source 22 produces a beam 6' that is a mixture of a continuum of visible light and laser light of a well defined wavelength, preferably a wavelength, such as infrared, outside the visible spectrum. Alternatively, the wavelength of the laser light can be within the visible spectrum, provided the resulting signal is distinguishable from that resulting from the visible light. The corresponding separate return beams 12V and 12I received by the detector 18 now generate respective signals 17V and 17I. The signal 17I is used to determine the deviation of the point P in the Z direction while the signal 17V can be broken down into a relatively large number of wavelengths by the microprocessor 20 to enable a much more accurate colorimetric measurement than can be achieved simply from the three primary colors. This system thus makes possible the detection of minor or other subtle color changes of a surface over time or during processing of such surface, e.g. cleaning or otherwise restoring.

FIG. 6 shows, in simplified form, an embodiment employing the optical configuration shown in Rioux U.S. Pat. No. 4,645,347. A laser 48 generates a so-called lamina or planar, multiwavelength beam 49, i.e. a beam that has a substantial extent in the Y direction while being very narrow in the X direction, whereby to project a stripe of light onto the surface of the object 8. By virtue of an apertured mask 44, a lens 42 focuses light 45 from the target onto a pair of spaced points on a two-dimensional, position sensitive detector 52, e.g. a CCD array, the spacing between these points being a measure of the Z deviation of the point P from the reference plane. Because the beams 45 pass through color dispersing devices 50, each beam is split, as before, into beams 45B, 45G and 45R, the signals seen by the microprocessor 20 being as shown by the three pairs of wavy lines 62B, 62G and 62R in FIG. 7. The amplitudes of the lines are processed as before to generate data on the color of the target surface, while the spacings D1, D2, etc. at different locations in the Y direction between a selected pair of lines, say the pair of lines 62G, indicates the Z data, i.e. the deviation in range. As in the previous examples, the apparatus will include means for scanning the light beam relative to the object in the X direction.

Figure 7:
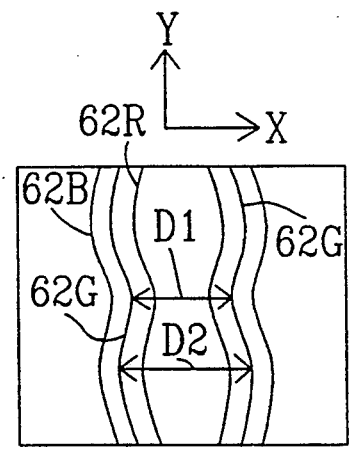
FIG. 7 shows signals generated in the embodiment of FIG. 6.
Figure 8:
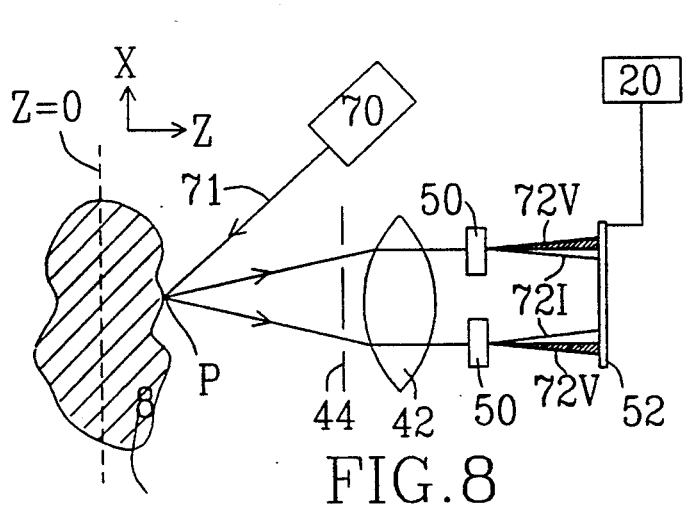
FIG. 8 is a modification of FIG. 6.
Figure 9:
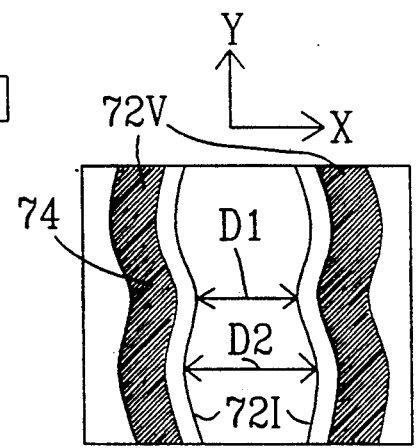
FIG. 9 shows signals generated in the arrangement of FIG. 8.

FIG. 8 shows an embodiment similar to that of FIGS. 6 and 7 but modified to employ a light source 70 for generating a laminar beam 71 that combines the visible continuum with a well defined laser wavelength as in FIG. 4. As a result the detector 52 receives beams 72V and 72I that have the shapes shown in FIG. 9. As in FIG. 7, spacings D1, D2 provide the Z data, while the nature of the spectrum 74 indicates the color of the surface.

Figure 10:
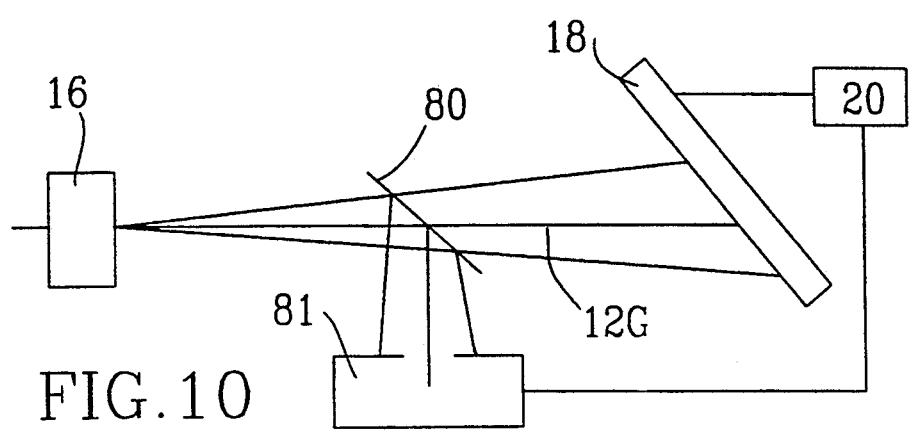
FIG. 10 shows a fragment of a modification of the system of FIG. 1.

FIG. 10 shows a modification in which the triangulation method of measuring range and hence the profile of the target surface is replaced by a time of flight (radar) type of system. A partial mirror 80 deflects a part of one of the return beams, say the beam 12G, into a detector 81 connected to the microprocessor 20. The incident beam is pulsed and the microprocessor measures and digitizes the range on the basis of the detected time of flight of the pulse from emission to return. The detector 18 need no longer be slanted to the optical axis, since it is no longer being used to measure range (profile), but it has been shown slanted in FIG. 10, because this is its usual orientation in a 3-D camera and one of the features of the present invention is a minimization of changes to the camera. Since the detector 18 is no longer required to be sensitive to range, the triangulation angle can be reduced to approximately zero, i.e. the incident beam can have an axis approximately parallel to that of the return beam, which is advantageous, especially when the target surface is comparatively remote from the camera. Hence the FIG. 10 embodiment, while calling for more modification to the camera than the methods of FIGS. 1-9 by virtue of the need for an additional detector 81, has the offsetting advantage of permitting adoption of a zero or very small angle between the axes of the incident and return beams.

I claim:

1. An optical method of determining the color and profile of a target surface, comprising
    (a) scanning said surface with an incident beam of light containing a plurality of wavelengths including at least one well defined wavelength,
    (b) determining the profile of the surface from a return beam reflected from the surface, and
    (c) dispersing said return beam into a plurality of separate return beams according to their wavelengths and imaging said separate return beams onto a position sensitive detector to generate signals representative of the color of the surface.

2. A method according to claim 1, wherein the incident beam contains three well defined wavelength corresponding to the primary colors, and said return beam is dispersed into three separate return beams each having one of said wavelengths.

3. A method according to claim 2, wherein the color is calculated from signals representing the respective intensities of the separate return beams of each of the three wavelengths.

4. A method according to claim 1, wherein the incident beam contains a continuum of visible light and a well defined wavelength distinguishable from said continuum, and said return beam is dispersed into two separate return beams having respectively the wavelength of said continuum and said well defined wavelength.

5. A method according to claim 4, wherein the color is calculated from signals representing the respective intensities of different wavelength portions of the separate return beam of the continuum.

6. A method according to claim 1, wherein the profile is calculated from signals that each represent a location on the position sensitive detector of the separate return beam of said well defined wavelength relative to a reference location.

7. A method according to claim 1, wherein the return beam is divided into a plurality of portions, each such portion being dispersed into a plurality of separate return beams according to wavelength, and the profile is calculated from signals representing the spacing on the position sensitive detector between the separate return beam of said well defined wavelength in respective ones of said return beam portions.

8. A method according to claim 1, wherein the profile is calculated from signals that each represent a time of flight between transmission of the incident beam and receipt of a return beam.

9. An optical method of determining the color and profile of a target surface, comprising scanning the surface with an incident beam of light and imaging a return beam reflected from the surface onto detecting means for generating signals representative of said profile, the detecting means including a position sensitive detector, characterised in that
    (a) the incident beam contains a plurality of wavelengths including at least one well defined wavelength, and
    (b) the return beam is dispersed into a plurality of separate return beams according to wavelength, said separate return beams being imaged onto the position sensitive detector to generate signals that are representative of the color of the surface.

10. An optical apparatus for determining the color and profile of a target surface, comprising
    (a) means for scanning said surface with an incident beam of light containing a plurality of wavelengths including a well defined wavelength,
    (b) means for imaging a return beam of light reflected from said surface,
    (c) detecting means including a position sensitive detector,
    (d) means for dispersing said return beam into a plurality of separate return beams according to their wavelengths and for directing said separate return beams onto the position sensitive detector, and
    (e) processing means for receiving from said position sensitive detector intensity signals corresponding to the amplitudes of respective ones of said separate return beams for calculating from said signals the color of the surface, and for receiving from said detecting means range signals corresponding to the range of said surface for calculating from said range signals the profile of the surface.

11. Apparatus according to claim 10, wherein said processing means calculates said profile from range signals that each represent a location of the separate return beam of said well defined wavelength relative to a reference location.

12. Apparatus according to claim 10, wherein said imaging means includes an apertured mask for dividing said return beam into a plurality of portions, said dispersing means being located for dispersing each of said return beam portions into a plurality of separate return beams, and wherein said processing means calculates said profile from range signals representing the spacing between the separate return beams of said well defined wavelength in respective ones of said return beam portions.

13. Apparatus according to claim 10, wherein said incident beam contains three well defined wavelengths of the primary colors and said processing means calculates said color from intensity signals representing the respective amplitude of the separate return beams of each of said three wavelengths.

14. Apparatus according to claim 10, wherein said incident beam contains a continuum of visible light and a well defined wavelength outside the visible continuum and said processing means calculates said color from intensity signals representing the respective amplitudes of different wavelength portions of the separate return beam of said continuum.

15. Apparatus for determining the color and profile of a target surface, comprising a source for producing an incident beam of light, means for scanning said beam over the target surface, detecting means including a position sensitive detector for connection to a microprocessor, an optical system for imaging a return beam of light reflected back from the surface onto the detecting means, the return beam being indicative of the ranges of points on the surface and hence of the profile of the surface, characterized in that the source produces a plurality of wavelengths including at least one well defined wavelength, and further characterized by means for dispersing the return beam into a plurality of separate return beams according to wavelength to enable the color of the surface to be determined by the microprocessor by measuring the relative intensities of signals received from the position sensitive detector corresponding to respective ones of said plurality of separate return beams.

16. Apparatus according to claim 15, wherein said source produces a beam comprising three well defined wavelengths corresponding respectively to the primary colors.

17. Apparatus according to claim 15, wherein said source produces a continuum of visible light and a well defined wavelength distinguishable from said continuum.

* * * * *